United States Patent [19]
Fujimoto et al.

[11] Patent Number: 6,115,426
[45] Date of Patent: Sep. 5, 2000

[54] ADAPTIVE COMMUNICATION APPARATUS

[75] Inventors: Mitoshi Fujimoto, Seto; Tsutayuki Shibata, Aichi-ken; Noriyoshi Suzuki, Nagoya; Chisato Endo, Tsukuba, all of Japan

[73] Assignee: Kabushiki Kaisha Toyota Chuo Kenkyusho, Aichi-ken, Japan

[21] Appl. No.: 08/976,261

[22] Filed: Nov. 21, 1997

[30] Foreign Application Priority Data

Nov. 22, 1996 [JP] Japan .................................. 8-327761
Sep. 29, 1997 [JP] Japan .................................. 9-282914

[51] Int. Cl.[7] .................................................. H04K 1/10
[52] U.S. Cl. .......................... 375/260; 375/267; 375/349; 370/319; 370/343; 370/344; 455/273
[58] Field of Search ..................................... 375/267, 285, 375/346, 347, 349, 260; 370/319, 343, 344; 455/273, 276.1

[56] References Cited

U.S. PATENT DOCUMENTS

| | | | |
|---|---|---|---|
| 4,179,657 | 12/1979 | Hobbs ......................................... | 325/33 |
| 4,512,034 | 4/1985 | Greenstein et al. ..................... | 455/139 |
| 4,797,950 | 1/1989 | Rilling ..................................... | 455/276 |
| 4,850,037 | 7/1989 | Bochmann ................................ | 455/276 |
| 4,947,409 | 8/1990 | Raith et al. ............................... | 375/97 |
| 5,625,871 | 4/1997 | Myer et al. .............................. | 455/33.1 |
| 5,875,216 | 2/1999 | Martin ..................................... | 375/347 |

FOREIGN PATENT DOCUMENTS 7-66739  3/1995  Japan .

Primary Examiner—Stephen Chin
Assistant Examiner—Dac V. Ha
Attorney, Agent, or Firm—Oblon, Spivak, McClelland, Maier & Neustadt, P.C.

[57] ABSTRACT

An adaptive communication apparatus for use in a multi-carrier transmission system in which data sequence to be transmitted is divided into a plurality of data sequences, and these data sequences are converted into a high-frequency signal including a plurality of carriers allocated different frequencies and radio-transmitted in parallel. In the adaptive communication apparatus, a received high-frequency signal is separated into a plurality of carriers by a wave separator. The frequency characteristic of the received high-frequency signal is corrected by a frequency characteristic compensation unit. The frequency characteristic compensation unit is controlled by a controller through use of the high-frequency signal subjected to signal processing by the frequency characteristic compensation unit and the wave separator. The high-frequency signal thus processed by the frequency characteristic compensation unit and the wave separator is demodulated by a demodulator in order to output a plurality of data sequences corresponding to the respective carriers. The original data is reproduced by a parallel-to-serial converter from the plurality of data sequences corresponding to the respective carriers.

22 Claims, 9 Drawing Sheets

ADAPTIVE COMMUNICATION APPARATUS

BACKGROUND OF THE INVENTION

1. Field of the Invention

The present invention relates to an adaptive communication apparatus used for improving communications quality of a multicarrier transmission system in which data are transmitted through use of a plurality of carriers allocated various frequencies.

2. Description of the Related Art

A multicarrier transmission has been proposed as a radio communication method for transmitting a large amount of data at high speed.

The multicarrier transmission method will be described with reference to FIG. 10. At the transmitting side, by a serial-to-parallel converter 206, a data sequence to be transmitted is divided into a plurality of low-speed data sequences which have a lower-speed transmission rate than that of the data sequence to be transmitted. The thus-divided low-speed data sequences are modulated by modulators 205 and converted into high-frequency signals allocated various carrier frequencies. By a combiner 203, these high-frequency signals are combined into a so-called multicarrier signal comprising a plurality of carrier signals, and the multicarrier signal is radiated from an antenna 201.

At the receiving side, the transmitted data are reproduced by performing the reverse of the foregoing operation. More specifically, the multicarrier signal received by an antenna 1 is subjected to wave separation by a wave separator 3 in order to obtain a plurality of carriers. The thus-separated respective carriers are demodulated by demodulators 5 to obtain low-speed data sequences. By a parallel-to-serial converter 6, the low-speed data sequences are converted into a high-speed transmission data sequence, thereby yielding a received data sequence.

In general, the frequency characteristic of transmission between the antenna on the transmitting side and the antenna on the receiving side (hereinafter referred to as the "channel frequency-characteristic") is distorted in a so-called multipath environment in which undesired interference waves arrive at the antenna along with a desired incident wave. In a case where the bandwidth of a transmitted signal is narrow, and the channel frequency-characteristic within this bandwidth can be regarded as flat, the spectrum and waveform of a received signal are analogous to those of the transmitted signal. If a receiver moves in such a case, the spectrum within the band varies uniformly. Such a variation of the spectrum is called a flat fading.

In contrast, in a case where the bandwidth of the transmitted signal is broad, and the channel frequency-characteristic within the bandwidth is distorted, the spectrum and waveform of the received signal is not analogous to that of the transmitted signal. Specifically, the spectrum of the signal received by the receiving antenna is the product of the spectrum of the transmitted signal and the channel frequency-characteristic. The spectral component of the transmitted signal is not received at the frequency at which there exists much fade in the channel frequency-characteristic. The fading in which a receiving level fades only at a specific frequency is called a frequency-selective fading. In case of a frequency-selective fading, the waveform of the received signal is severely distorted, thereby considerably deteriorating communications quality.

The bandwidth of a signal to be transmitted depends on the transmission rate of the data. The higher the transmission rate of the data, the wider the bandwidth of the transmitted signal becomes. Accordingly, as data are transmitted at higher speed, deterioration of communications quality attributable to the frequency-selective fading becomes more severe.

In the multicarrier transmission system, a transmitted data sequence is divided into a plurality of data sequences, and the respective data sequences are converted into a high-frequency signal that includes a plurality of carriers having different frequencies. More specifically, the influence of the frequency-selective fading is alleviated by reducing the data transmission rate of each carrier in order to narrow the bandwidth of each carrier. Accordingly, the multicarrier transmission method is expected to serve as a technique for realizing high-speed and high-quality communications.

However, the reduction of the receiving level owing to the flat fading arises even if the data transmission rate per carrier is reduced so as to prevent the deterioration of communication quality attributable to the influence of the frequency-selective fading. The plurality of carriers may include a carrier whose receiving level becomes low due to the flat fading. In this case, the data transmitted through use of such a carrier are not correctly demodulated at the receiving side.

To prevent this problem, there has been conceived a method in which if a multicarrier signal includes a carrier which cannot be correctly demodulated, the data of this carrier signal is corrected through use of correctly-demodulated data of other carrier signals. In the proposed method, however, data used for determining whether or not the data have been correctly received or data used for correcting the erroneous data must be added to the original data to be transmitted. As a result, in comparison with the case having no such redundant data, the amount of information transmitted per unit bandwidth is reduced, thereby resulting in a reduction in frequency utilization efficiency.

Another countermeasure against this problem is described in Japanese Patent Application Laid-Open (kokai) No. 7-66739, in which variation in the amplitude of each received carrier with time is detected, and the frequency characteristic of the carrier signal is corrected so as to reduce the variation. FIG. 11 shows an embodiment of this method. According to the conventional technique shown in FIG. 11, the signals received by a plurality of antennas 1 are separated by wave separators 3 in order to obtain a plurality of paired carriers. The phase of one of the paired carriers is controlled based on a minimum amplitude deviation diversity scheme, and the paired carrier signals are combined together. More specifically, an amplitude deviation detector 101 detects the amplitude deviation of the combined signal, and a signal representing the thus-detected amplitude deviation is input to a control circuit 102. The control circuit 102 controls a phase shifter 103 so as to minimize the thus-detected amplitude deviation. Demodulator 5 demodulates the combined carriers to obtain corresponding data sequences, and the data sequences are converted into the original data by a parallel-to-serial converter 6.

However, if the paired carriers are combined together through use of the minimum amplitude deviation diversity, there is a possibility that the amplitude of the combined signal becomes small, depending on a phase difference between a desired wave and an interference wave. Therefore, the foregoing problem, i.e., the deterioration of communication quality of a specific carrier, cannot be solved. To prevent this situation, the conventional communication apparatus is provided with a carrier determination circuit 104 and a plurality of control circuits 102. If one of the control circuits 102 for a certain carrier cannot properly control the phase of the certain carrier because the amplitude of the corresponding combined signal is too small, the carrier determination circuit 104 produces control information for the certain carrier on the basis of information from other control circuits which properly perform phase control, and sends the thus-prepared control information to the control circuit 102 for the certain carrier.

In this case, however, the other control circuits are also controlled based on the minimum amplitude deviation diversity. Even if the amplitude deviation of the certain carrier is reduced as a result of controlling the phase of the corresponding counterpart carrier on the basis of the information from other control circuits, there is no guarantee that the receiving level of the certain carrier increases. Accordingly, the foregoing problem, the deterioration of communication quality of a specific carrier, cannot be solved comprehensively.

As described above, the influence of the frequency-selective fading can be reduced by the multicarrier transmission method. However, the communication quality of a certain carrier may be deteriorated due to the flat fading. This problem is solved by the method of adding redundant data to the original data to be transmitted, which, however, results in a reduction in the frequency utilization efficiency of the overall multicarrier signal. Further, as previously described, the method employing the minimum amplitude deviation technique cannot be said to constitute means for completely eliminating the deterioration of the communication quality of a certain carrier. For these reasons, there is demand for the development of a adaptive communication apparatus for use in a multicarrier transmission system which is capable of reliably demodulating all the data of carriers without sacrificing frequency utilization efficiency.

SUMMARY OF THE INVENTION

An object of the present invention is to provide an adaptive communication apparatus which realizes normal demodulation of all data transmitted using a multicarrier transmission method and to achieve a high efficiency of frequency utilization.

To achieve the above object, the present invention provides an adaptive communication apparatus for use in a multicarrier transmission system in which a data sequence to be transmitted is divided into a plurality of data sequences, and these data sequences are converted into a high-frequency signal including a plurality of carriers allocated different frequencies and is radio-transmitted, the apparatus comprising a frequency characteristic compensation unit for correcting the frequency characteristic of a received high-frequency signal that includes a plurality of carriers (hereinafter also referred to as a carrier group); a wave separator for separating the carrier group into the respective carriers; a controller for controlling the frequency characteristic compensation unit through use of the carrier group subjected to signal processing of the frequency characteristic compensation unit and the wave separator; a demodulator for demodulating the carrier group thus signal-processed by the frequency characteristic compensation unit and the wave separator in order to output a plurality of low-speed data sequences; and a parallel-to-serial converter for reproducing one data sequence from the low-speed data sequences output from the demodulator.

Preferably, the adaptive communication apparatus has a structure such that the received high-frequency signal that includes the plurality of carriers is first input to the frequency characteristic compensation unit in order to correct the frequency characteristic of the high-frequency signal; the corrected signal is then input to the wave separator in order to obtain signals corresponding to the respective carriers; and the carrier group which has its frequency characteristic corrected and is separated into the respective carriers is input to the controller and the demodulator.

Alternatively, the adaptive communication apparatus has a structure such that the received high-frequency signal that includes the plurality of carriers is first input to the wave separator in order to obtain signals corresponding to the respective carriers; the thus-obtained signals are then input to the frequency characteristic compensation unit in order to correct the frequency characteristic; and the carrier group which is separated into the respective carriers and then has its frequency characteristic corrected is input to the controller and the demodulator.

In both cases, the received high-frequency signal which includes a plurality of carriers and which is to be input to the wave separator or the frequency characteristic compensation unit may be a signal received by an array antenna consisting of a plurality of antenna elements. Alternatively, the received high-frequency signal which includes a plurality of carriers and which is to be input to the wave separator or the frequency characteristic compensation unit may be composed of signals which are obtained by dividing a signal received by a single antenna to obtain divided signals and delaying the divided signals through use of a delay unit.

In a case where a signal to be input to the wave separator or the frequency characteristic compensation unit is received through use of the array antenna, the frequency characteristic compensation unit may comprise a weighting unit for weighting the signals received by the respective antenna elements and a combiner for combining the signals weighted by the weighting unit.

In a case where a delay unit is used to produce a signal to be input to the wave separator or the frequency characteristic compensation unit, the frequency characteristic compensation unit may comprise a weighting unit for weighting the respective signals having different delay times and a combiner for combining together the signals weighted by the weighting unit.

In the adaptive communication apparatus, the controller may have a structure to compare a reference signal periodically inserted into data to be transmitted with a reference signal provided on the reception side, and to control the frequency characteristic compensation unit such that a difference detected as a result of such comparison is minimized. Alternatively, the controller may have a structure to control the frequency characteristic compensation unit such that the amplitude or power of each carrier of the carrier group signal-processed by the frequency characteristic compensation unit and the wave separator become equal to each predetermined value.

In the adaptive communication apparatus of the present invention, a plurality of sets of the above-described frequency characteristic compensation unit, wave separator, and controller may be provided in such a way that the signals corresponding to the respective carriers of each carrier group are brought in phase with each other. More specifically, the present invention provides a adaptive communication apparatus for use in a multicarrier transmission system in which a data sequence to be transmitted is divided into a plurality of data sequences, and these data sequences are converted into a high-frequency signal that includes a plurality of carriers allocated different frequencies and is radio-transmitted, the apparatus comprising a plurality of incident wave extractors each of which extracts only one incident wave component from the received high-frequency signal; a phase shifter for adjusting the phase of each of the incident wave components extracted by the incident wave extractors; a combiner for combining together the incident wave components whose phase are adjusted by the phase shifter; a demodulator for demodulating the signal combined by the combiner in order to output a plurality of low-speed data sequences corresponding to the respective carriers; and a parallel-to-serial converter for reproducing one data sequence from the low-speed data sequences output from the demodulator. The incoming wave extractor may be composed of a frequency characteristic compensation unit for correcting the frequency characteristic of the high-frequency signal, a wave separator for separating the high-frequency signal into signals corresponding to the respective carriers, and a controller for controlling the frequency characteristic compensation unit through use of the high-frequency signal signal-processed by the frequency characteristic compensation unit and the wave separator. As a result of addition of this configuration to the adaptive communication apparatus, in a case where a signal wave and another wave delayed for a given period of time with respect to the signal wave are superimposed on each other, the signal wave and the delayed wave can be combined, thereby resulting in an increase in the power of an output signal and an improvement in the accuracy of receipt of a signal.

First, in the present invention, a high-frequency signal which includes a plurality of carriers allocated different frequencies which is transmitted by a multicarrier transmission method is subjected to the signal processing of the wave separator and the frequency characteristic compensation unit. The order in which the carrier group is subjected to signal processing is changeable. Which of the wave separator or the frequency characteristic compensation unit may come first. The signal-processed carrier group is input to the controller, and the controller controls the frequency characteristic compensation unit through use of the input carrier group. The carrier group radio-transmitted by the multicarrier transmission system can be demodulated reliably.

The channel frequency-characteristic within a full frequency range used for the multicarrier transmission system can be estimated by monitoring the amplitude and phase of each of the carriers within the carrier group signal-processed by the wave separator and the frequency characteristic compensation unit. Accordingly, the controller controls the frequency characteristic compensation unit in such a way as to correct the distortion of the thus-estimated channel frequency-characteristic.

The frequency characteristic compensation unit weights the plurality of wide-band signals and combines together the thus-weighted wide-band signals, whereby one carrier group whose frequency characteristic is corrected is output. As shown in FIGS. 1 and 2, a plurality of wide-band signals— which differ from each other with regard to the relationship of phase between a desired wave and an interference wave received by the plurality of antenna elements—are used as the plurality of wide-band signals input to the frequency characteristic compensation unit. Alternatively, as shown in FIG. 3, a wide-band signal received by one antenna element is input to a tapped delay line unit, and a plurality of wide-band signals—which are produced by delaying the wide-band signal for different periods of time—are used as the plurality of wide-band signals.

As a result, if the frequency characteristic of the carrier group is properly corrected, the spectrum of the corrected carrier group becomes equal to that of the carrier group radiated from the transmitting side even if the spectrum of the carrier group received by the antenna element is distorted due to the influence of an interference wave. Consequently, all the data transmitted by the multicarrier transmission method can be correctly reproduced.

As described above, the order in which the carrier groups are subjected to signal processing is changeable, and which of the wave separator or the frequency characteristic compensation unit may come first. More specifically, all the data transmitted by the multicarrier transmission method are correctly reproduced by the structure shown in FIG. 1, in which after the frequency characteristic of a received high-frequency signal including a plurality of carriers has been corrected by the frequency characteristic compensation unit, the thus-corrected signal is separated into signals corresponding to the respective carriers by the wave separator, and the signals are input to the demodulator and the controller; or in the structure shown in FIG. 2 in which after a received high-frequency signal including a plurality of carriers has been separated into signals corresponding to the respective carrier, the frequency characteristics of the signals are corrected by the frequency characteristic compensation unit and are input to the demodulator and the controller.

Preferably, the foregoing advantage of correct reproduction of all the data transmitted by the multicarrier transmission method can be ensured even in a case where an array antenna composed of a plurality of antenna elements receives a high-frequency signals that includes a plurality of carriers, and the thus-received signal is input to the wave separator or the frequency characteristic compensation unit, as well as where the frequency characteristic compensation unit comprises a weighting unit for weighting the signal received by each of the antenna elements and a combiner for combining together the signals weighted by the weighting unit.

Preferably, the foregoing advantage of correct reproduction of all the data transmitted by the multicarrier transmission method can be ensured even in a case where a high-frequency signal which includes a plurality of carriers and which is received by one antenna element is divided by the dividing unit to obtain divided signals; the divided signals are delayed by the delay unit; and the thus-delayed signals are input to the wave separator or the frequency characteristic compensation unit, as well as where the frequency characteristic compensation unit comprises a weighting unit for weighting each of the thus-delayed signals and a combiner for combining together the thus-weighted signals.

In accordance with another aspect of the present invention, the controller controls the frequency characteristic compensation unit so as to minimize a difference between the amplitude and phase of each carrier input to the demodulator and those of a preset reference signal.

The distortion of the frequency characteristic of the carrier group owing to the channel frequency-characteristic can be compensated by receiving the reference signal periodically inserted into the data to be transmitted, comparing the thus-received reference signal with the reference signal previously provided on the reception side, and controlling the frequency characteristic compensation unit so as to minimize a difference detected as a result of such comparison. More specifically, the received signal is a convolution of the true reference signal, or the reference signal previously provided on the reception side, and the channel frequency-characteristic. Therefore, the correction of the frequency characteristic of the signal received in such a way as to minimize the difference between the two signals results in a compensation for the distortion of the channel frequency characteristic of the received signal.

The frequency characteristic of a received signal is corrected in such a way that the spectrum of the carrier group input to the demodulator becomes equal to the spectrum of a predetermined carrier group; e.g., the spectrum of a carrier group radiated from the transmitting side. Accordingly, the data transmitted by the multicarrier transmission method can be correctly reproduced.

In accordance with still an other aspect of the present invention, the controller controls the frequency characteristic compensation unit in such a way that the amplitude or power of each carrier of the carrier group signal-processed by the frequency characteristic compensation unit and the wave separator become equal to a predetermined value.

Unless the received carriers are distorted by the channel frequency-characteristic, all the carriers are received while they are equal to each other in terms of amplitude or power. For this reason, the frequency characteristic of the carrier group can be corrected in such a way that the spectrum of the carrier group input to the demodulator becomes equal to a predetermined spectrum; e.g., the spectrum of the carrier group radiated from the transmitting side, by controlling the frequency characteristic compensation unit such that the amplitude or power of each carrier becomes equal to each predetermined value. Therefore, the data transmitted by the multicarrier transmission method can be correctly reproduced.

In accordance with yet another aspect of the present invention, the adaptive communication apparatus is provided with a plurality of incoming wave extractors that have the foregoing configuration and each detect a plurality of incident waves, and the thus-extracted incident waves are brought in phase with each other and then combined. As a result, the power of the signal can be increased.

DETAILED DESCRIPTION OF THE PREFERRED EMBODIMENTS

The present invention will be described hereinbelow with reference to specific embodiments.

Figure 1:
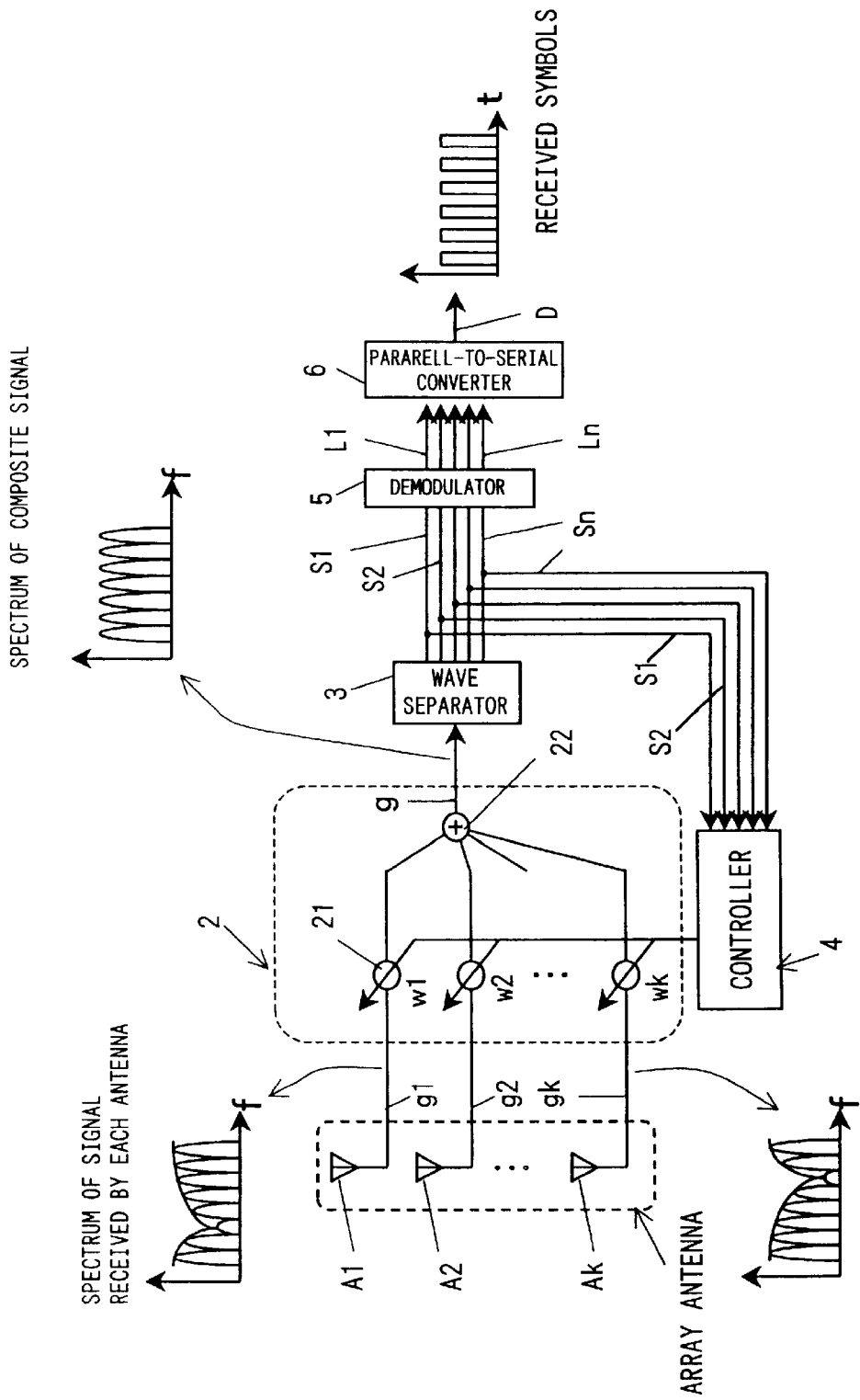
FIG. 1 is a block diagram showing the configuration of an adaptive communication apparatus in accordance with a first embodiment of the present invention.

FIG. 1 is a block diagram illustrating the configuration of an adaptive communication apparatus in accordance with a first embodiment of the present invention. This apparatus receives data sequences radio-transmitted by a multicarrier transmission method and reproduces an original data sequence by processing the thus-received data sequences.

Carrier groups which are transmitted by a multicarrier transmission method and each of which includes a plurality of carriers (n carriers) are received by a plurality of antenna elements (k antenna elements) A1 to Ak. As a result, the antenna elements A1 to Ak can receive a plurality of carrier groups (hereinafter referred to as wide-band signals) g1 to gk which differ from each other with regard to the relationship of phase between a desired wave and an interference wave.

A frequency characteristic compensator 2 comprises a weighting unit 21 for independently weighting the wide-band signals g1 to gk, and a combiner 22. The weighting unit 21 weights each of the wide-band signals g1 to gk in accordance with a weighting coefficient determined by the controller 4. The thus-weighted wide-band signals are combined by the combiner 22, whereby the signals are output as one carrier group "g" whose frequency characteristic has been corrected.

The carrier group "g" whose frequency characteristic has been corrected is subjected to wave separation by the wave separator 3 in order to obtain a plurality of carriers. In other words, signals S1 to Sn corresponding to the respective carriers whose distortions attributable to the channel frequency-characteristic have been corrected are output. A demodulator 5 demodulates the signals S1 to Sn, whereby low-speed data sequences L1 to Ln are produced. The thus-produced low-speed data sequences L1 to Ln are sent to a parallel-to-serial converter 6, where an original data sequence D is reproduced. In this way, the plurality of received wide-band signals g1 to gk are processed into a single carrier group "g" whose frequency characteristic is corrected. This carrier group "g" is demodulated on a carrier-by-carrier basis, and the thus-demodulated signals are subjected to parallel-to-serial conversion, whereby the original data sequence D is reproduced.

A controller 4 controls the frequency characteristic compensator 2 through use of the signals Si to Sn derived from the carrier group "g." A weighting coefficient of the weighting unit 21 is determined for each of the plurality of received wide-band signals g1 to gk. Through use of the weighting unit 21, the frequency characteristic compensator 2 weights each wide-band signal according to the weighting coefficient determined by the controller 4.

A method by which the controller 4 determines weighting coefficients will now be described. Each of the weighting coefficients is a coefficient represented by a complex number, and the amplitude and phase of each carrier group are controlled by weighting the wide-band signal with the coefficient.

A reference signal is periodically inserted into a data sequence to be transmitted, and this sequence is then transmitted. Upon receipt of the transmitted data including the reference signal inserted therein, the thus-received data are compared with the reference signal previously provided on the reception side and are controlled so as to minimize the difference from the reference signals. This control is implemented by an LMS (Least Mean Squares) algorithm or a RLS (Recursive Least Squares) algorithm. The algorithm is intended to control weighting coefficients so as to minimize the sums of squared errors of the weighted combined signals with respect to the reference signals provided at the reception side in advance. Defining the number of carriers used for transmitting data as "n," the number of the antennas as "k," the weighted and combined signals (base-band signals) as $S_1$ to $S_n$, reference signals (base-band signals) previously provided on the reception side as $S_{01}$ to $S_{0n}$, and weighting coefficients as $W_1$ to $W_k$, $S_1$ to $S_n$ are functions of $W_1$ to $W_k$ ($W_1 = B_1 \exp(-j\theta_1)$, $W_k = B_k \exp(-j\theta_k)$). Then weighting coefficients, $W_1$ to $W_k$ are determined so as to minimize $$(S_1 - S_{01})^2 + (S_2 - S_{02})^2 + \ldots + (S_n - S_{0n})^2 \quad (1)$$

The respective weighting coefficient is determined so as to minimize the difference between the combined signal and the previously-provided reference signal. Thus the wide-band signals g1 to gk received by the plurality of antennas are weighted in such a way that the interference components of these wide-band signals are canceled. As a result, only the carrier group "g" comprising components of desired waves can be obtained by the frequency characteristic compensator 2. Accordingly, the transmitted data can be substantially correctly reproduced.

Figure 2:
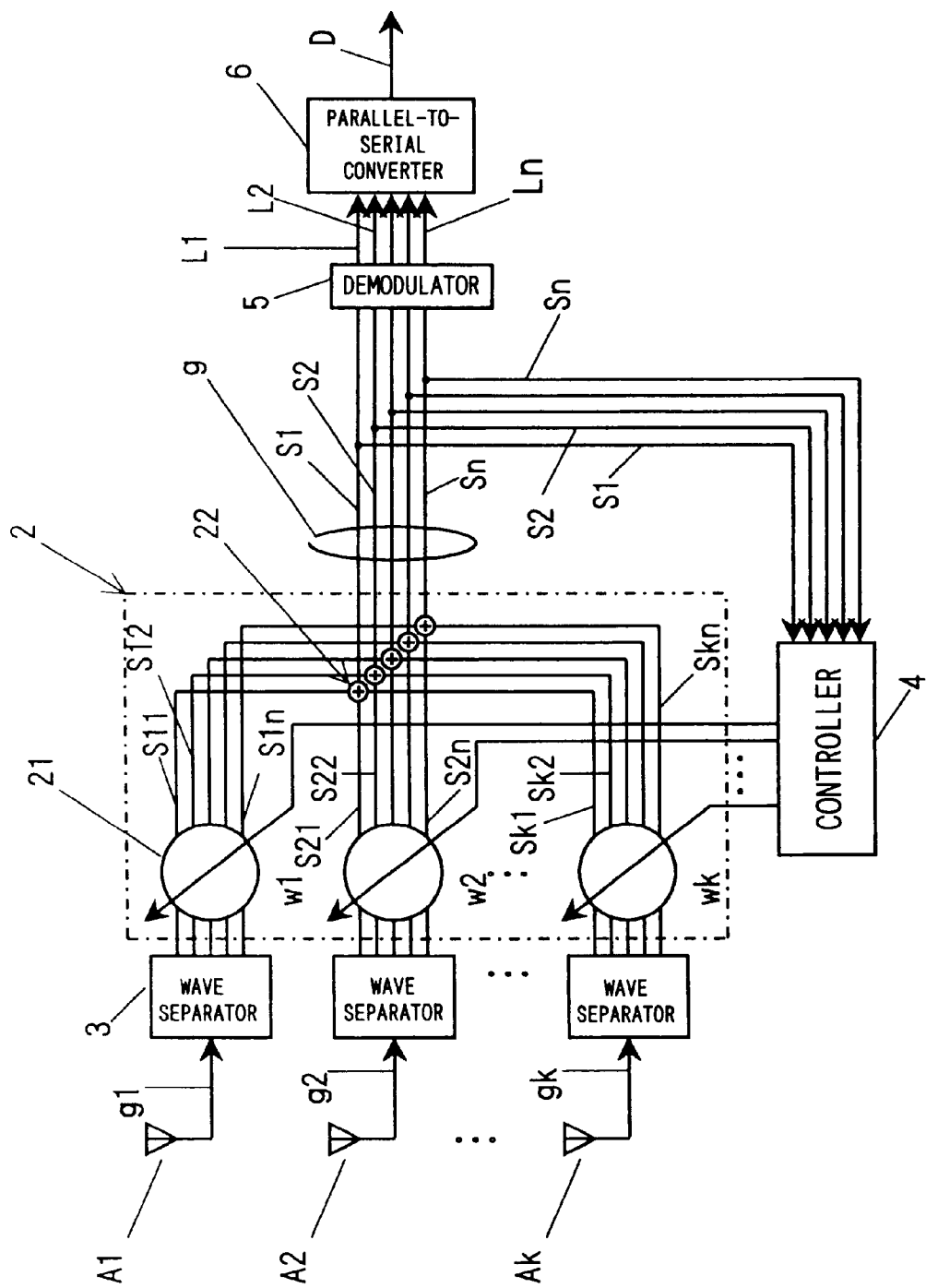
FIG. 2 is a block diagram showing the configuration of the adaptive communication apparatus in accordance with the first embodiment.

In the first embodiment, the wide-band signals g1 to gk received by the individual antenna elements A1 to Ak are initially input to the frequency characteristic compensator 2 and further to the wave separator 3 in order to process the signals. However, as shown in FIG. 2, each of the wide-band signals g1 to gk may be first subjected to wave separation to produce signals $S_{11}$ to $S_{kn}$ corresponding to the carriers of the wide-band signal. The thus-produced signals are then input to the frequency characteristic compensator 2 in order to process the signals. The first number i in each set of subscripts of the signals $S_{ij}$ corresponds to the wide-band signal $g_i$ which includes the signal $S_{ij}$, and the second number j in the set of the subscripts represents a carrier included in the wide-band signal $g_i$. In this case, the weighting unit 21 does not weight the respective signals $S_{11}$ to $S_{kn}$ corresponding to the carriers of each of the wide-band signals g1 to gk with different weighting coefficients, but weights the signals $S_{i1}$ to $S_{in}$ corresponding to the carriers of one wide-band signal $g_i$ with the same weighting coefficient. The weighting following the separation of the wave can be performed more accurately than can the weighting performed in the first embodiment. Thus, the transmitted data can be reproduced more reliably compared to the case of the first embodiment.

Figure 3:
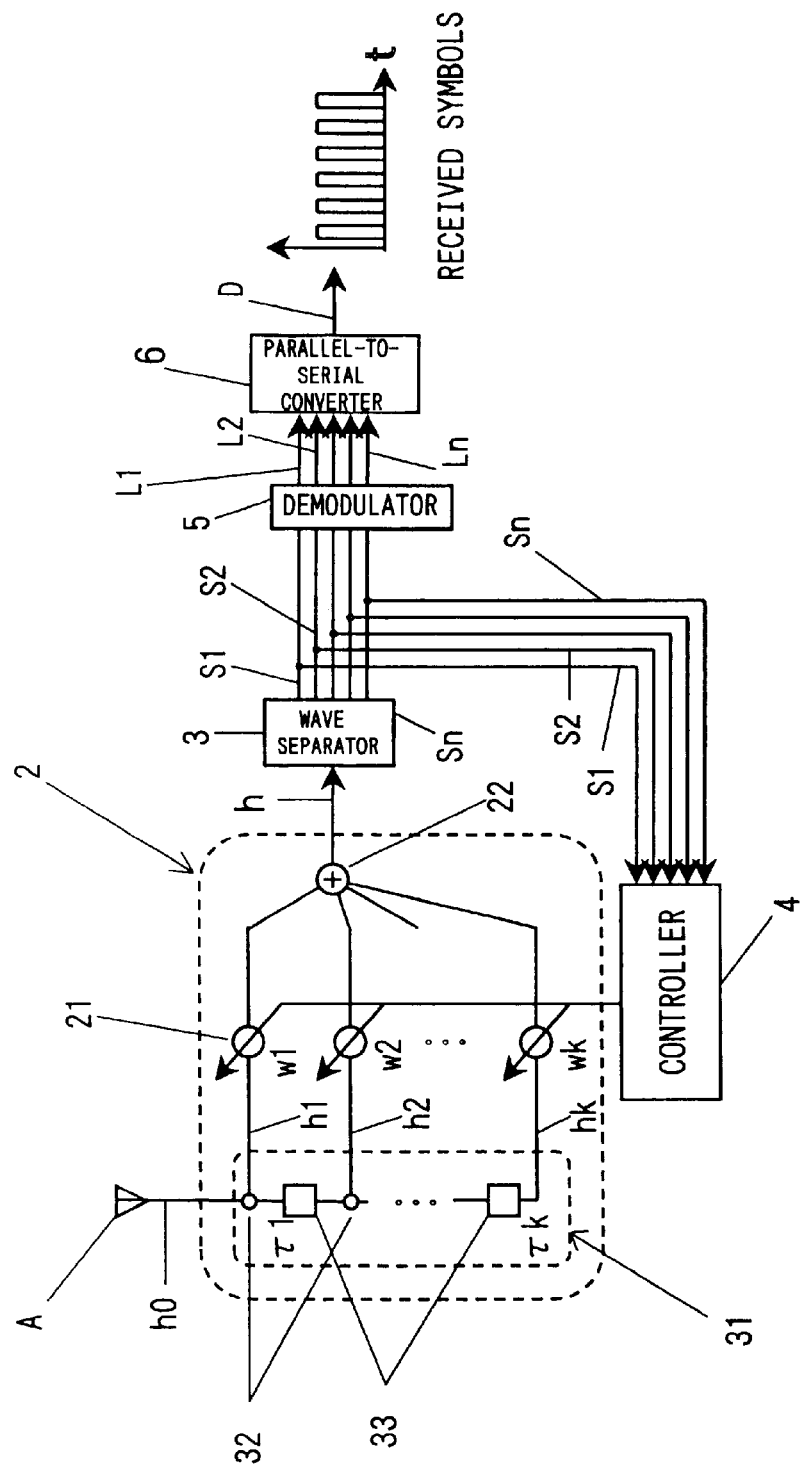
FIG. 3 is a block diagram showing the configuration of a adaptive communication apparatus in accordance with a second embodiment of the present invention.

A second embodiment of the present invention will now be described. FIG. 3 is a block diagram showing the configuration of an adaptive communication apparatus in accordance with the second embodiment. An antenna A is consisting of one antenna element and receives a wide-band signal h0 transmitted by the multicarrier transmission method. The frequency characteristic compensator 2 comprises a tapped delay unit 31, the weighting unit 21, and the combiner 22. By the tapped delay unit 31, the received wide-band signal h0 is transformed into a plurality of wide-band signals (k wide-band signals) h1 to hk having different delay times. The tapped delay unit 31 comprises dividing unit 32 and delay devices 33. Delay is introduced every time a signal passes each of the delay devices 33. The thus-delayed signal is then divided by each of the dividing units 32, enabling production of a plurality of signals delayed for different periods of time.

The plurality of wide-band signals h1 to hk having different delay times are input to the weighting unit 21, where each of the signals is weighted. More specifically, the weighting unit 21 weights each of the wide-band signals h1 to hk with the weighting coefficient determined by the controller 4. The thus-weighted plurality of wide-band signals h1 to hk are combined together by the combiner 22 in order to obtain one carrier group "h" whose frequency characteristic has been corrected.

The carrier group "h" is subjected to wave separation carried by the wave separator 3, so that the signals $S_1$ to $S_n$ corresponding to the respective carriers are obtained. Distortions of these signals $S_1$ to $S_n$ attributable to the channel frequency-characteristic are compensated. The signals $S_1$ to $S_n$ derived from the carrier group "h" are sent to the controller 4 and the demodulator 5.

The controller 4, the demodulator 5, and the parallel-to-serial converter 6 have functions identical to those of the first embodiment. In other words, the controller 4 determines weighting coefficients, and the demodulator 5 demodulates the signals $S_1$ to $S_n$ corresponding to the respective carriers, thereby producing low-speed data sequences L1 to Ln. The parallel-to-serial converter 6 reproduces the original transmitted data sequence D from the low-speed data sequences L1 to Ln. As in the first embodiment, the controller 4 determines the weighting coefficients through use of the LMS algorithm or the RLS algorithm.

Although, in the first and second embodiments, the controller 4 determines a weighting coefficient through use of either the LMS algorithm or the RLS algorithm, it can even determine the weighting coefficients through use of a CMA (Constant Modulus Algorithm). The CMA is an algorithm for controlling weighting coefficients by utilization of variations in the amplitude of a weighted and combined signal. Further details regarding this algorithm are described in "The Tone Capture Properties of CMA-Based Interference Suppressers," J. R. Treichler and M. G. Larimore (vol. 4, IEEE Trans. Acoust. Speech and Signal Process, ASSP-33, pp. 496–958 (1985). However, in the conventional CMA, weighting coefficients are controlled by utilization of variation in the amplitude of a received signal with time resulting from interference between a desired wave and an interference wave.

In the present invention, distortion of the channel frequency-characteristic is detected from a received carrier group, and weighting coefficients are controlled so as to make the channel frequency-characteristic constant. An example in which weighting coefficients are determined by the CMA will be given below.

In the case of a modulation system using a constant amplitude, e.g., PSK or FSK, as well as where all carriers of the same amplitude are transmitted, the amplitudes $G_1$ to $G_n$ of the weighted and combined signals $S_1$ to $S_n$ represent the frequency characteristic of transmission channel between the transmitting antenna and an output terminal of the combiner 22, where n is the number of carriers used for transmitting data. Accordingly, if the channel frequency-characteristic is corrected by the frequency characteristic compensator 2, all the amplitudes $G_1$ to $G_n$ become equal. Defining the number of carrier groups to transmit data as "n" and weighting coefficients as $W_1$ to $W_k$, the amplitudes $G_1$ to $G_n$ are functions of $W_1$ to $W_k$. Then the weighting coefficients $W_1$ to $W_k$ are determined so as to minimize the following Equation (2).

$$|G_1^p - \sigma^p|^q + |G_2^p - \sigma^p|^q + \ldots + |G_n^p - \sigma^p|^q \cdots \quad (2)$$

where p, q represent positive integers and σ is a target amplitude. When Equation (2) is minimized, all the amplitudes $G_1$ to $G_n$ of the signals carried by each carrier become equal to the given amplitude σ. As a result, in the first embodiment applied to the constant amplitude method, it becomes possible to correct the frequency characteristic of the received signal so as to cancel the interference wave. On the other hand, in the second embodiment applied to the same method, weighting coefficients are determined in such a way that the compensatory frequency characteristic of the received signal become the inverse of the channel frequency-characteristic, thereby enabling cancellation of the influence of the channel frequency-characteristic and correct reproduction of the transmission data sequence D. Further, this method eliminates the need for transmission of a reference signal, thereby enabling a further increase in frequency utilization efficiency in comparison with that obtained in the case where a weighting coefficient is determined by the LMS or RLS algorithm.

If a comparative relationship between amplitudes of the respective carriers of the transmitted signal is evident, optimum-weighting coefficients can be determined by a method similar to the foregoing method. Accordingly, each carrier to be transmitted is not necessarily required to have the same amplitude. In that case the respective amplitudes of carriers are adjusted so that they have the respective target values. Although, in the previous embodiment, weighting coefficients are controlled such that all the amplitudes of the carriers become equal to a given amplitude, the weighting coefficients may be controlled such that the power of each carrier becomes equal to a given target power determined in place of a target amplitude. Even in this case, the same advantageous result as that yielded in the previous embodiment is obtained, and the transmitted data sequence D can be correctly reproduced. Although, in the previous embodiment, all of carriers are used to determine the weighting coefficients, only a part of carriers may be used to do so.

Figure 4:
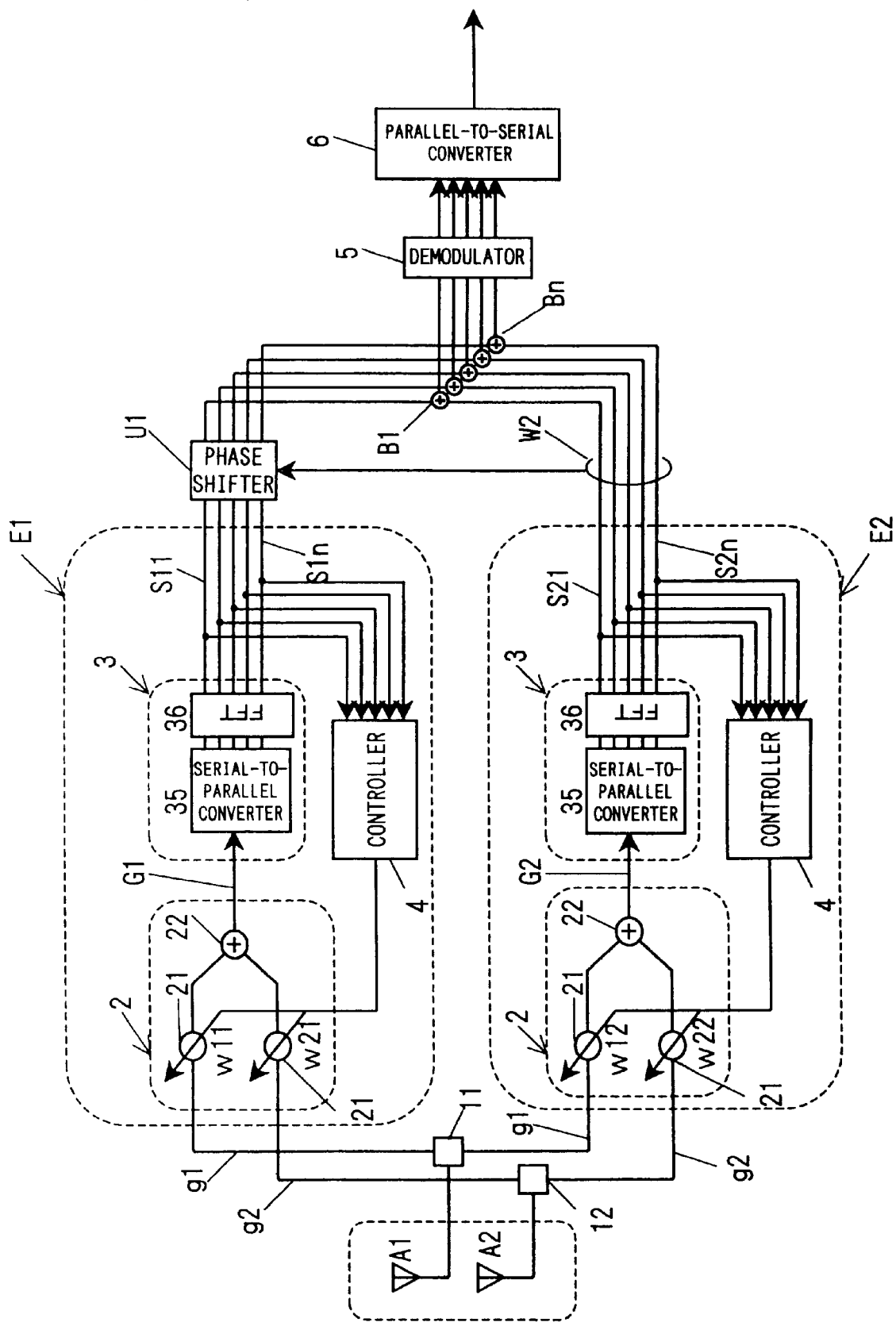
FIG. 4 is a block diagram showing the configuration of a adaptive communication apparatus in accordance with a third embodiment of the present invention.

An adaptive communication apparatus in accordance with a third embodiment will now be described. FIG. 4 shows the configuration of this apparatus. The apparatus in this embodiment is characterized by comprising incident wave extractors E1, E2, each of which consists of the frequency characteristic compensator 2, the wave separator 3, and the controller 4 employed in the first embodiment shown in FIG. 1. In the third embodiment, a carrier group which contains a plurality of carriers (n carriers) and which is transmitted using the multicarrier transmission method is received by two antenna elements A1, A2. As a result, the antenna elements A1, A2 can receive two wide-band signals g1, g2 which differ from each other with regard to the phase relationship between a desired wave and an interference wave.

As in the first embodiment, the frequency characteristic compensator 2 comprises the weighting unit 21 for independently weighting the wide-band signals g1, g2 and the combiner 22. The weighting unit 21 weights each of the wide-band signals g1, g2 with the weighting coefficient determined by the controller 4. The thus-weighted wide-band signals are combined together by the combiner 22, whereby the thus-combined signals are output as one carrier group G1 whose frequency characteristic has been corrected. Similarly, the incident wave extractor E2 outputs one carrier group G2 which is produced by the combiner 22 and has been corrected with regard to its frequency characteristic.

The adaptive communication apparatus according to the third embodiment is characterized by comprising the wave separator 3, a phase shifter U1 for equalizing the phases of the separated signals which are output from the incident wave extractors E1, E2 and which correspond to the respective carriers, and a phase detector W2. The phases of signals S11 to S1n are controlled by the phase shifter U1 such that the phases of signals S11 to S1n become equal to the phases of the signals S21 to S2n detected by the phase detector W2, respectively.

The wave separator 3 comprises a serial-to-parallel converter 35 and a fast Fourier transform unit (hereinafter referred to as an FFT arithmetic unit) 36. A phase control method characterizing the adaptive communication apparatus of the third embodiment will be described hereinbelow. An explanation will be given of a case where two incident waves (i.e., a first incident wave and a second incoming wave) are received by the two antenna elements A1, A2.

The signal received by the antenna element A1 is divided into two signals g1, g1 by a dividing unit 11, and the signals g1, g1 are input to the incident wave extractors E1 and E2, respectively. Similarly, the signal received by the antenna element A2 is divided into two signals g2, g2 by a dividing unit 12, and the signals g2, g2 are input to the incident wave extractors E1 and E2, respectively. In the incident wave extractor E1, weighting coefficients w11 to w21 used in the frequency characteristic compensator 2 are controlled in such a way that all the amplitudes of the signals S11 to S1n corresponding to the respective carriers which are output from the wave separator 3 become equal to each other. Similarly, in the incident wave extractor E2, weighting coefficients W12 to W22 used in the frequency characteristics compensator 2 are controlled in such a way that all the amplitudes of the signals S21 to S2n corresponding to the respective carriers which are output from the wave separator 3 become equal to each other. As a result, the incident wave extractors E1, E2 each output only one incident wave component of the two incident waves. Here, the conversion timing of a serial-to-parallel converter 35 determines which of the components of the two incident waves is output.

The operation of the wave separator 3 that greatly affects the operation characteristic of the incident wave extractors E1 and E2 will be described. This wave separator 3 comprises the serial-to-parallel converter 35 which samples a series signal output from the frequency characteristic compensator 2 at predetermined time intervals and converts the thus-sampled signals into parallel data, and an FFT arithmetic unit 36 which performs FFT arithmetic processing for the parallel data to obtain the components of the respective carriers. More specifically, the parallel data sampled by the serial-to-parallel converter 35 are subjected to the FFT arithmetic processing, and hence the serial-to-parallel converter 35 acts as a so-called FFT window. If the timing at which the data are sampled through the FFT window is in agreement with the timing of the data contained in a certain incident wave, a null of directional pattern of array antenna is formed in the direction of other incident waves. As a result, the incident wave extractors E1 and E2 output only the incoming wave components whose timings match the sampling timings, respectively.

Therefore, if the conversion timing of the serial-to-parallel converter 35 is matched with the timing of the data contained in the first incident wave, the incident wave extractor E1 outputs only the first incident wave components. In contrast, if the conversion timing is matched with the timing of the data contained in the second incident wave, the incident extractor E1 outputs only the second incident wave.

Figure 5:
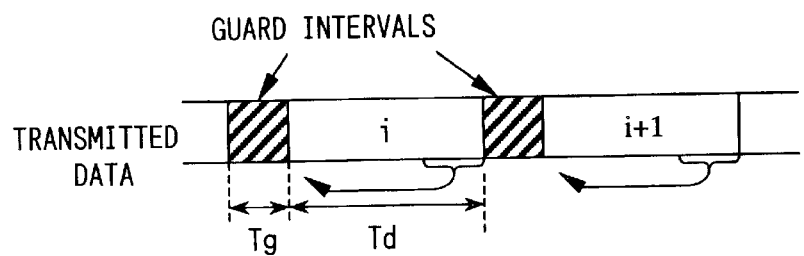
FIGS. 5 through 7 are timing charts for explaining the principle of operation of the adaptive communication apparatus in accordance with the third embodiment.

The adaptive communication apparatus according to the third embodiment receives incident waves effectively particularly in a case where a guard interval is inserted into transmission data at the transmitting side as a countermeasure against delayed wave in the multicarrier transmission system. An explanation will be given of the outline of the guard interval and the operation of the adaptive communication apparatus in a case where the guard interval is inserted into transmitted data. As shown in FIG. 5, the guard interval is a contrivance to add a part of the transmitted data immediately before data to be transmitted at the transmitting side. At the reception side, only a period Td of the data is sampled and demodulated while a period Tg of the guard interval (hereinafter referred to as guard time) is ignored.

Figure 6:
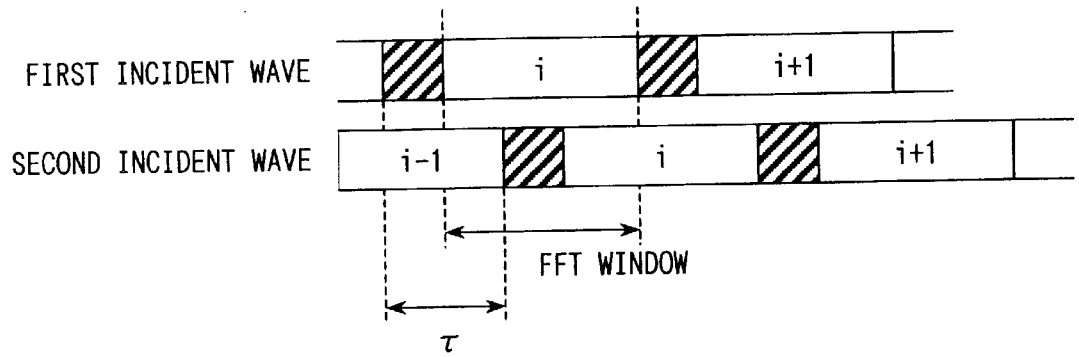

If the second incident wave arrives at the antenna later than the first incident wave, and the delay time τ of the second incident wave is longer than the guard time Tg, the timing of the data contained in the first incident wave and the timing of the data contained in the second incident wave have the relationship shown in FIG. 6. In this case, if the timing of the FFT window is matched to the first incident wave, the preceding data (i.e., data i−1) of the second incident wave are combined to the inside of the FFT window. Accordingly, if two incident waves are simultaneously received, a waveform becomes distorted under the influence of the preceding data of the second incident wave.

Figure 7:
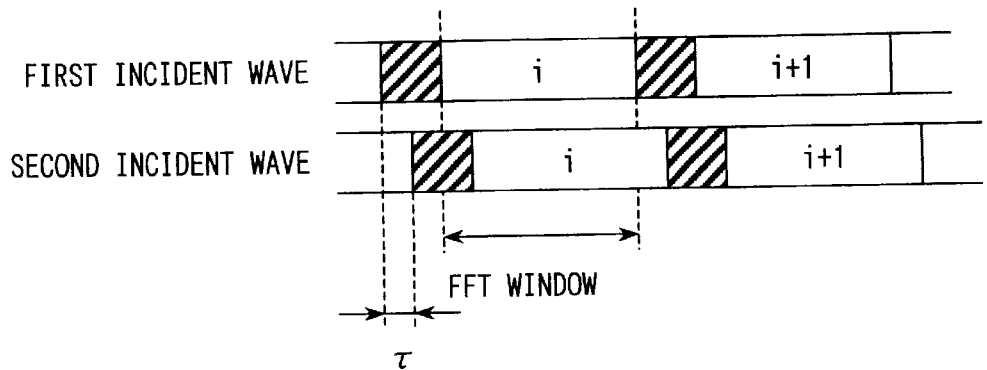

In a case where the delay time τ of the second incident wave is shorter than the guard time Tg, the timing of the data contained in the first incident wave and the timing of the data contained in the second incident wave have the relationship shown in FIG. 7. In this case, if the timing of the FFT window is matched to the timing of the first incident wave, the FFT window includes the components of the data contained in the first incident wave, a part of the data contained in the second incident wave, and a part of the guard interval included in the second incident wave. Here, the waveform of the guard interval of the second incident wave is identical to that of a part of the data contained in the second incident wave (data i), and also identical to that of a part of the data (data i) contained in the first incident wave. Accordingly, the first incident wave and the second incident wave are completely identical to each other with regard to waveforms; they differ from each other only in phase. More specifically, if the delay time τ of a delayed wave is equal to or smaller than the guard time Tg, a resultant waveform does not become distorted even if the first and second incident waves are received concurrently. For these reasons, in general, the guard time Tg is set to a value which is longer than the expected delay time τ of the second incident wave so as to prevent the waveform from becoming distorted. However, a phase difference between the first and second incident waves changes carrier by carrier. Therefore, the first and second incident waves are canceled at the frequency at which they become 180° out of phase with each other, thereby resulting in a very small signal intensity and hence deteriorating communications quality.

To prevent these problems, as shown in FIG. 4, the adaptive communication apparatus is provided with the two incident wave extractors E1, E2, and the first and second incident waves are extracted individually. After the phases of the carriers of the two incident waves respectively extracted by the incident wave extractors E1, E2 have been matched to each other for every carrier signal S11 to S1n, each of the carriers S11 to S1n are combined by combiners B1 to Bn. A resultant composite signal is demodulated by the demodulator 5. However, when the guard intervals are inserted into the transmitted signal and the delay time τ between the incident waves is replaced with the phase difference between the first and second incident waves, the phase difference between the first and second incident waves varies carrier by carrier. Therefore, phase adjustment is performed for each carrier. It is not necessarily required that the conversion timing of the serial-to-parallel converter 35 be accurately matched to the timing of the incident wave, provided that the timings of two FFT windows, or the timings of the serial-to-parallel converters 35, are so set within the guard time Tg as to become slightly displaced from each other in such a way as to prevent the conversion timings of the serial-to-parallel converters 35 of the two incident wave extractors E1, E2 from becoming equal to each other. As a result, the two incident wave extractors E1, E2 each output different incident wave components individually.

As described above, in the above specific embodiment, two incident waves are individually output from the two incident wave extractors E1, E2. The thus-output waves are combined after their phases have been matched to each other for each carrier. As a result, the two incident waves are each utilized effectively, and hence communications quality is improved further in this embodiment in comparison with the case where only one incident wave is utilized.

For brevity, the above explanation pertains to the case where the two antenna elements A1, A2 receive two incident waves, and the thus-received incident wave components are individually output through use of the two incident wave extractors E1, E2. However, the number of antenna elements and incident wave extractors may be greater than two. Further, there is no need to match the number of antenna elements to the number of incident wave extractors. As a larger number of antenna elements are used, the directional pattern of an array antenna can be controlled more flexibly. Consequently, the greater the number of incident wave extractors, the more effectively a large number of incident waves can be utilized.

Figure 8:
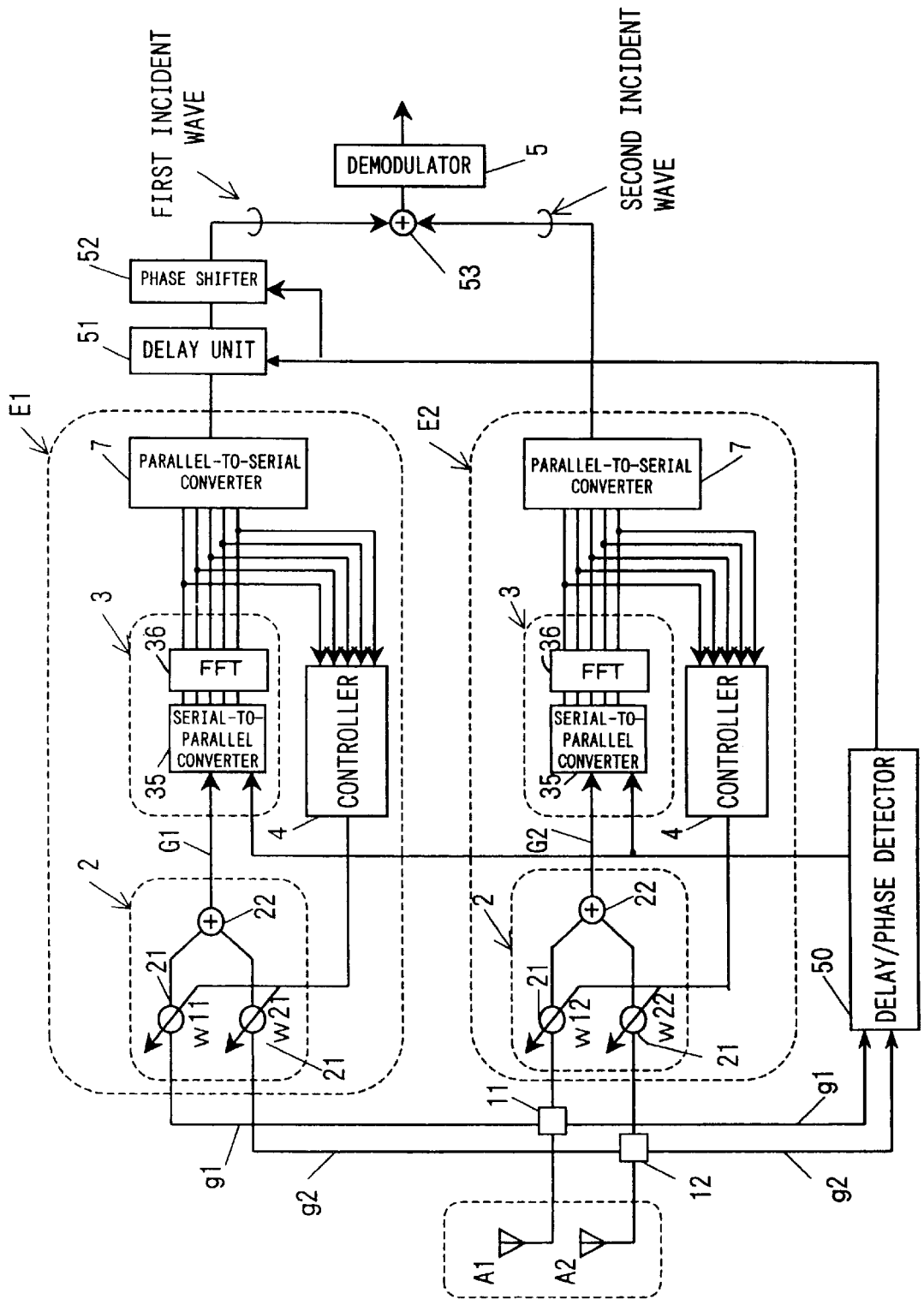
FIG. 8 is a block diagram showing the configuration of an adaptive communication apparatus in accordance with a fourth embodiment of the present invention.

Next, an adaptive communication apparatus in accordance with a fourth embodiment of the present invention will be described. FIG. 8 shows the configuration of this apparatus. In the fourth embodiment, the adaptive communication apparatus employed in the third embodiment is further provided with a delay/phase detector 50 and a delay unit 51. After received signals have been subjected to parallel-to-serial conversion by the parallel-to-serial converters 7 contained in the incident wave extractors E1, E2, the delay and phase of the signals are controlled. In other respects, the adaptive communication apparatus in the fourth embodiment is identical to that employed in the third embodiment.

The adaptive communication apparatus according to the fourth embodiment is designed so as to be able to individually receive a plurality of incident waves and appropriately combine them into one signal even in a case where guard intervals are not inserted into transmitted data at the transmitting side. The operation of this apparatus will now be explained.

Figure 9:
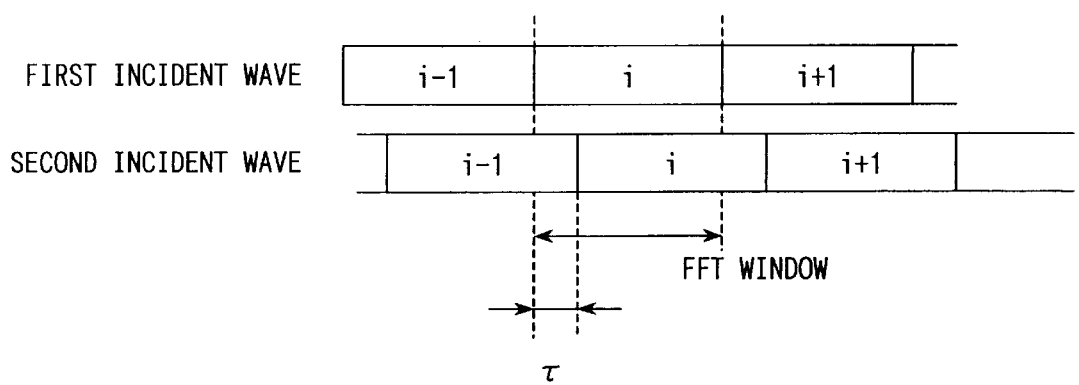
FIG. 9 is a timing chart for explaining the principle of operation of the adaptive communication apparatus in accordance with the third embodiment.
Figure 10:
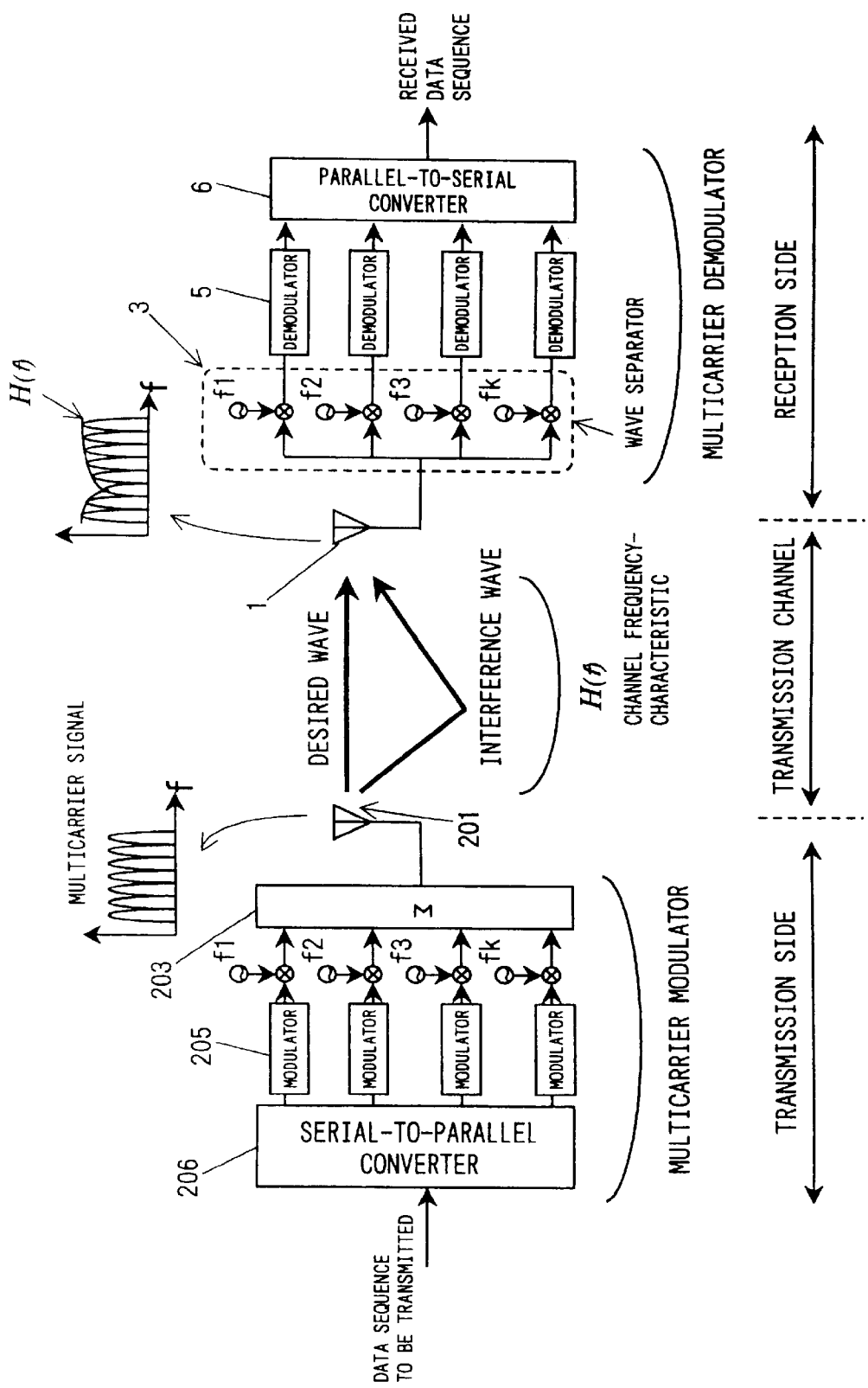
FIG. 10 is a schematic representation showing a multicarrier transmission system.
Figure 11:
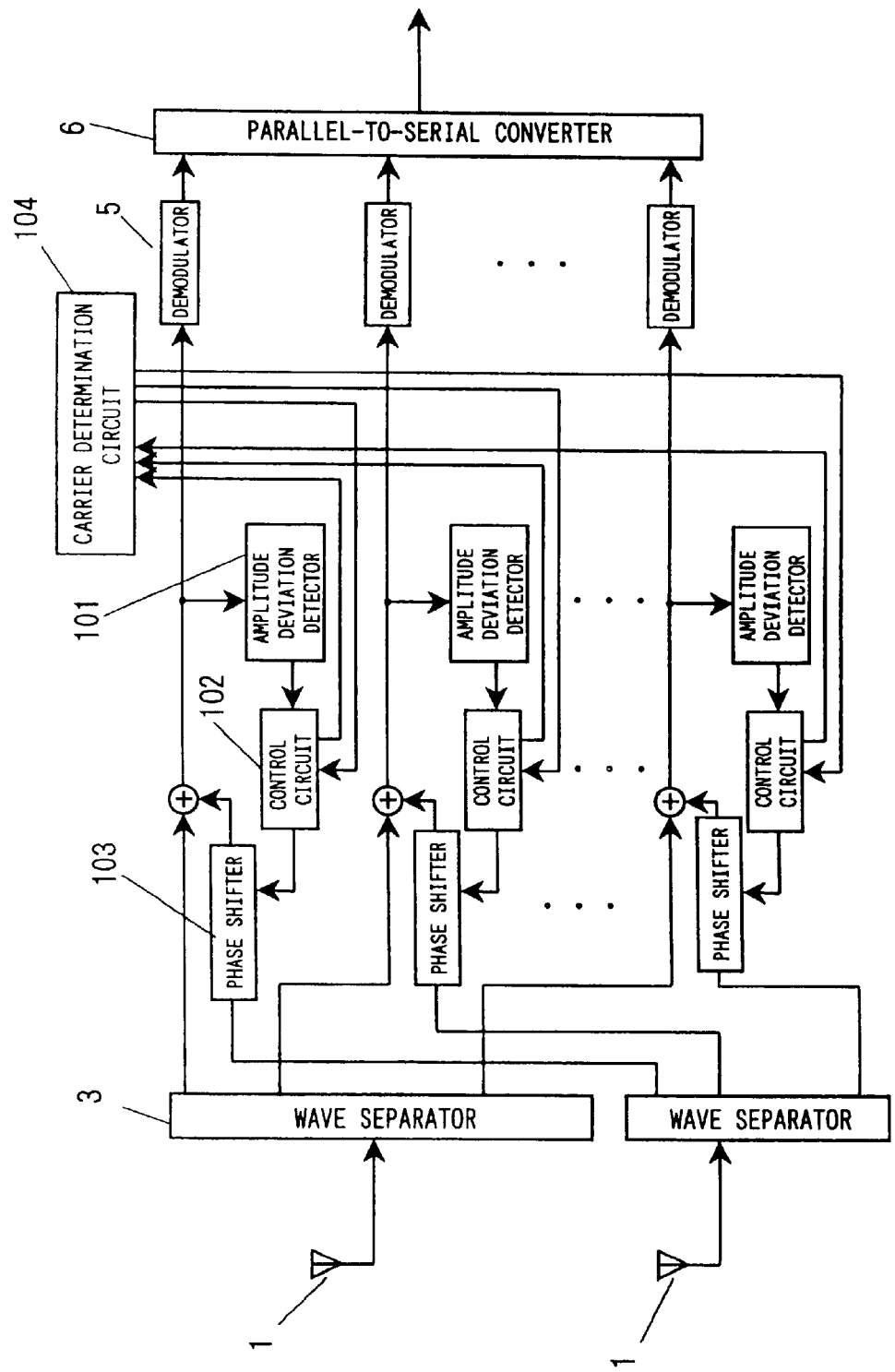
FIG. 11 is a circuit diagram showing a conventional method for compensating for carrier frequency characteristic.

In a case where the guard intervals are not inserted into transmitted data at the transmitting side, the timing of the data contained in the first incident wave and the timing of the data contained in the second incident wave have the relationship shown in FIG. 9. More specifically, if the second incident wave arrives at the antenna even slightly later than the first incident wave, the preceding data (data i−1) of the second incident wave are combined to the inside of the FFT window. Accordingly, in order to cause the incident wave extractors E1, E2 to individually output the first and second incident wave components, it is necessary to accurately match the timing of the FFT window of the incident wave extractor E1 to the timing of the first incident wave, and the timing of the FFT window of the second incident wave extractor E2 to the timing of the second incident wave. For these reasons, in the fourth embodiment, the signals g1, g2 received by the antennas A1, A2 are input to the delay/phase detector 50, where the delay time between and the phases of the first and second incident waves are detected from the signals. The conversion timings of the serial-to-parallel converters 35 of the first and second incident wave extractors E1, E2, i.e., the timings of the FFT windows, are determined on the basis of the thus-detected delay time and the phases. Here, the phase of each of the carriers output from the incident wave extractors E1 and E2 is determined by the phase of the incident wave. Therefore, the phases of the carriers output from one incident wave extractor are all the same.

To simplify the delay and phase-conversion processing, the following processing is carried out in the fourth embodiment. Specifically, a parallel signal is converted into a serial signal by the parallel-to-serial converter 7 contained in each of the incident wave extractors E1 and E2. Subsequently, a serial signal output from the incident wave extractor E1 is matched to a serial signal output from the incident wave extractor E2 in terms of time and phase. These serial signals of both systems are combined by a combiner 53, and the resultant composite signal is output to the demodulator 5.

What is claimed is:

1. An adaptive communication apparatus for use in a multicarrier transmission system in which a data sequence to be transmitted is divided into a plurality of data sequences, converted into a high-frequency signal including a plurality of carriers with different frequencies and radio-transmitted in parallel, said apparatus comprising:

a wave separator for separating a received high-frequency signal into a plurality of carriers;

a frequency characteristic compensation unit for correcting frequency characteristic of the received high-frequency signal;

a controller for controlling said frequency characteristic compensation unit through use of the high-frequency signal subjected to signal processing by said frequency characteristic compensation unit and said wave separator;

a demodulator for demodulating the high-frequency signal thus signal-processed by said frequency characteristic compensation unit and said wave separator in order to output a plurality of data sequences corresponding to the respective carriers; and a parallel-to-series converter for producing one data sequence from the plurality of data sequences corresponding to the respective carriers;

wherein the received high-frequency signal that includes the plurality of carriers is first input to said frequency characteristic compensation unit in order to correct the frequency characteristic of the high-frequency signal; the corrected signal is then input to said wave separator in order to obtain signals corresponding to the respective carriers; and the obtained signals are input to said controller and said demodulator.

2. An adaptive communication apparatus according to claim 1, further comprising a plurality of antenna elements which receive signals to be output to said wave separator or said frequency characteristic compensation unit.

3. An adaptive communication apparatus according to claim 1, further comprising a plurality of antenna elements which receive the high-frequency signal including a plurality of carriers and to be output to said wave separator or said frequency characteristic compensation unit.

4. An adaptive communication apparatus according to claim 1, further comprising an antenna unit in which the high-frequency signal to be input to said wave separator or said frequency characteristic compensation unit is generated by dividing a signal received by a single antenna to obtain divided signals and delaying the divided signals by various periods of time through use of a delay unit.

5. An adaptive communication apparatus according to claim 1, wherein said frequency characteristic compensation unit comprises a weighting unit for weighting the high frequency signals received by the respective antenna elements and a combiner for combining the signals weighted by said weighting unit.

6. An adaptive communication apparatus according to claim 1, wherein said frequency characteristic compensation unit comprises a weighting unit for weighting the respective divided signals having different delay times; and a combiner for combining together the signals weighted by said weighting unit.

7. An adaptive communication apparatus for use in a multicarrier transmission system in which a data sequence to be transmitted is divided into a plurality of data sequences, converted into a high-frequency signal including a plurality of carriers with different frequencies, and radio-transmitted in parallel, said apparatus comprising:

a wave separator for separating a received high-frequency signal into a plurality of carriers;

a frequency characteristic compensation unit for correcting high frequency characteristic of the received high-frequency signal;

a controller for controlling said frequency characteristic compensation unit based on said plurality of carriers included in said high-frequency signal subjected to signal processing by said separator so that a frequency characteristic determined by one of amplitudes and powers of said respective carriers have a predetermined characteristic;

a demodulator for demodulating the high-frequency signal signal-processed by said frequency characteristic compensation unit and said wave separator in order to output a plurality of data sequences corresponding to the respective carriers; and a parallel-to-serial converter for reproducing one data sequence from the plurality of data sequences corresponding to the respective carriers, wherein said controller compares a reference signal periodically inserted into data to be transmitted with a reference signal provided on a reception side to obtain a difference therebetween, and controls said frequency characteristic compensation unit such that the difference is minimized.

8. An adaptive communication apparatus for use in a multicarrier transmission system in which a data sequence to be transmitted is divided into a plurality of data sequences, converted into a high-frequency signal including a plurality of carriers with different frequencies, and radio-transmitted in parallel, said apparatus comprising:

a wave separator for separating a received high-frequency signal into a plurality of carriers;

a frequency characteristic compensation unit for correcting high frequency characteristic of the received high-frequency signal;

a controller for controlling said frequency characteristic compensation unit based on said plurality of carriers included in said high-frequency signal subjected to signal processing by said separator so that a frequency characteristic determined by one of amplitudes and powers of said respective carriers have a predetermined characteristic;

a demodulator for demodulating the high-frequency signal signal-processed by said frequency characteristic compensation unit and said wave separator in order to output a plurality of data sequences corresponding to the respective carriers; and a parallel-to-serial converter for reproducing one data sequence from the plurality of data sequences corresponding to the respective carriers, wherein said controller controls said frequency characteristic compensation unit so that all of said amplitudes or powers of said respective carriers become equal to a predetermined value.

9. An adaptive communication apparatus for use in a multicarrier transmission system in which data sequence to be transmitted is divided into a plurality of data sequences, converted into a high-frequency signal including a plurality of carriers with different frequencies, and radio-transmitted in parallel, said apparatus comprising:

a plurality of incident wave extractors each of which extracts only one of the incident wave components from a received high-frequency signal;

a phase shifter for adjusting a phase of each of the incident wave components extracted by said incoming wave extractors;

a combiner for combining together the incident wave components whose phases are adjusted by said phase shifter;

a demodulator for demodulating the incident wave components combined by said combiner in order to output a plurality of data sequences corresponding to the respective carriers; and a parallel-to-serial converter for reproducing one data sequence from the plurality of data sequences corresponding to the respective carriers, wherein each of said incident wave extractors comprises:
a frequency characteristic compensation unit for correcting frequency characteristic of the high-frequency signal;
a wave separator for separating the high-frequency signal into signals corresponding to the respective carriers; and
a controller for controlling the frequency characteristic compensation unit through use of the high-frequency signal processed by said frequency characteristic compensation unit and said wave separator.

10. An adaptive communication apparatus according to claim 9, wherein said high-frequency signal includes guard intervals which are formed by adding a part of data to be transmitted to the data to be transmitted.

11. An adaptive communication apparatus according to claim 9, wherein said wave separator comprises a serial-to-parallel converter for converting an input signal to a parallel signal, and a Fourier transform unit to which the parallel signal is input from said serial-to-parallel converter and which outputs said signals corresponding to the respective carriers.

12. An adaptive communication apparatus according to claim 11, wherein the serial-to-parallel converter of each of said incident wave extractors converts a corresponding signal into parallel signals at different timings within a delay time corresponding to the guard interval.

13. An adaptive communication apparatus according to claim 9, wherein said phase shifter adjusts each of said phases for the respective carriers.

14. An adaptive communication apparatus according to claim 9, further comprising a delay and phase detection unit for detecting the delay time and phase of each of the incident wave components from the received high-frequency signal and for providing said respective serial-to-parallel converter of each of said incident wave extractors with timing for conversion from the serial signal to the parallel signals based on the detected delay time and phase.

15. An adaptive communication apparatus according to claim 14, wherein said phase shifter commonly adjusts said phases with respect to said carriers.

16. An adaptive communication apparatus according to claim 14, further comprising a matching unit for compensating the delay of each of the incident wave components output from said incident wave extractors in accordance with the delay time and phase of each of said incident wave components detected by said delay and phase detection unit, and adding said incident wave components just in phase, said matching unit being an alternative to said phase shifter.

17. An adaptive communication apparatus for use in a multicarrier transmission system in which a data sequence to be transmitted is divided into a plurality of data sequences, converted into a high-frequency signal including a plurality of carriers with different frequencies, and radio-transmitted in parallel, said apparatus comprising:

a wave separator for separating a received high-frequency signal into a plurality of carriers;

a frequency characteristic compensation unit for correcting high frequency characteristic of the received high-frequency signal;

a controller for controlling said frequency characteristic compensation unit based on said plurality of carriers included in said high-frequency signal subjected to signal processing by said separator so that a frequency characteristic determined by one of amplitudes and powers of said respective carriers have a predetermined characteristic;

a demodulator for demodulating the high-frequency signal signal-processed by said frequency characteristic compensation unit and said wave separator in order to output a plurality of data sequences corresponding to the respective carriers; and a parallel-to-serial converter for reproducing one data sequence from the plurality of data sequences corresponding to the respective carriers, wherein the received high-frequency signal that includes the plurality of carriers is first input to said wave separator in order to obtain signals corresponding to the respective carriers; the thus-obtained signals are then input to said frequency characteristic compensation unit in order to correct the frequency characteristic; and the corrected signals are input to said controller and said demodulator.

18. An adaptive communication apparatus according to claim 17, further comprising a plurality of antenna elements which receive signals to be output to said wave separator or said frequency characteristic compensation unit.

19. An adaptive communication apparatus according to claim 17, further comprising a plurality of antenna elements which receive the high-frequency signal including said plurality of carriers and to be output to said wave separator or said frequency characteristic compensation unit.

20. An adaptive communication apparatus according to claim 17, further comprising an antenna unit in which the high-frequency signal to be input to said wave separator or said frequency characteristic compensation unit is generated by dividing a signal received by a single antenna to obtain divided signals and delaying the divided signals by various periods of time through use of a delay.

21. An adaptive communication apparatus according to claim 17, wherein said frequency characteristic compensation unit comprises a weighting unit for weighting the high frequency signals received by the respective antenna elements and a combiner for combining the signals weighted by said weighting unit.

22. An adaptive communication apparatus according to claim 17, wherein said frequency characteristic compensation unit comprises a weighting unit for weighting the respective divided signals having different delay times; and a combiner for combining the signals weighted by said weighting unit.

* * * * *